UNITED STATES PATENT OFFICE.

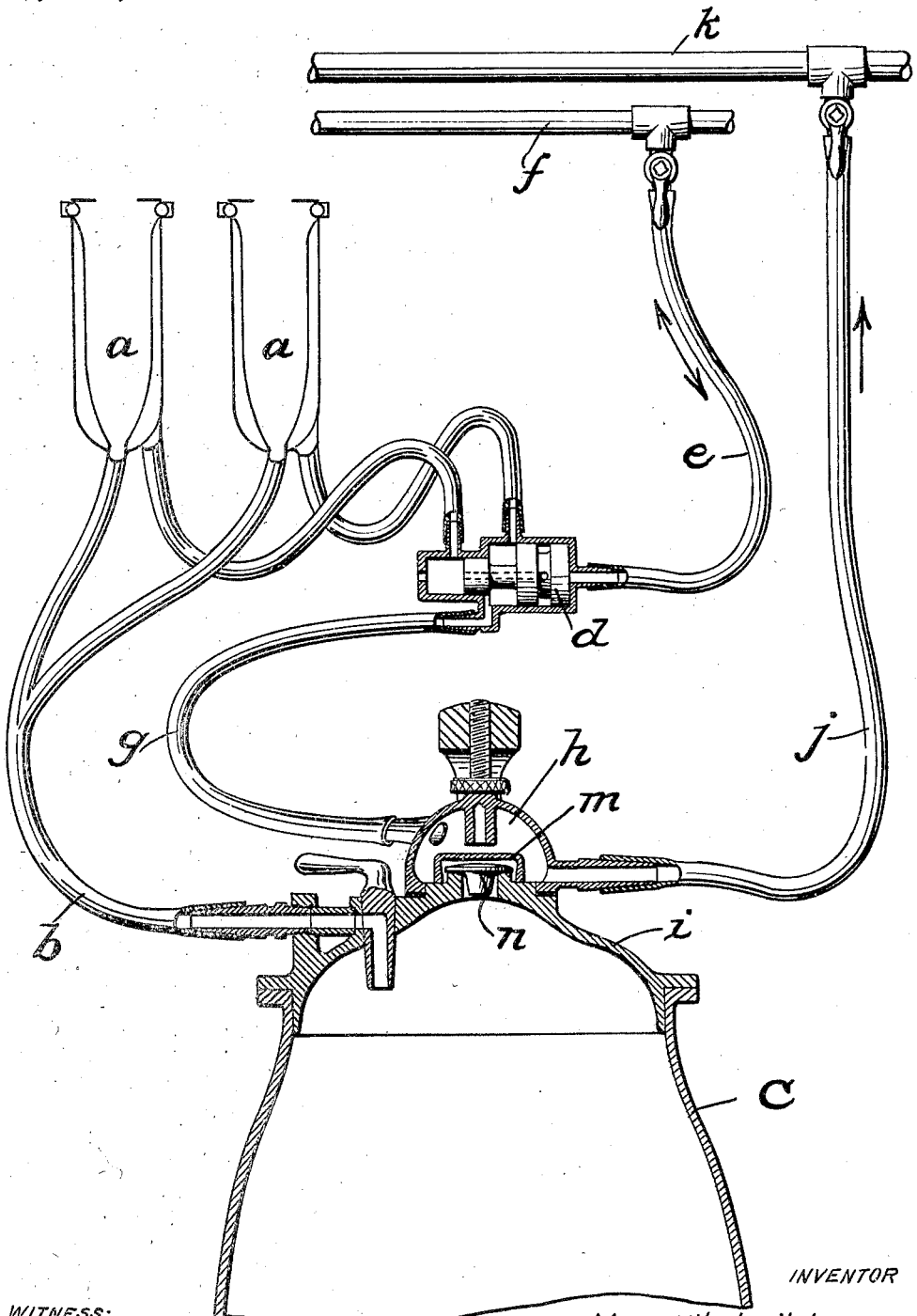

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

MILKING-MACHINE.

1,394,433.  Specification of Letters Patent.  Patented Oct. 18, 1921.

Application filed October 27, 1919. Serial No. 333,491.

*To all whom it may concern:*

Be it known that I, MEREDITH LEITCH, a citizen of the United States, residing at Poughkeepsie, county of Dutchess, and State of New York, have invented a new and useful Improvement in Milking-Machines, of which the following is a full, clear, and exact description, reference being had to the accompanying drawings, which form a part of this specification.

My invention relates to milking machines wherein the milk pail is kept under a partial vacuum and has for its object to prevent the entrance to the pail from the piping of water, vapor or air, which may be contaminated with many kinds of bacteria.

It is known to place at the suction discharge from the milk pail a check valve, the purpose of which is to allow free passage of air from the pail but prevent the entrance to the pail of any liquid or vapor either during the milking operation or upon the disconnection of the vacuum tube from the vacuum line at the conclusion of the operation. Such check valves have not proven wholly satisfactory, in that it is difficult to so construct them as to insure that they shall at all times seat tightly. The entrance of even a minute volume of contaminated fluid must be effectually guarded against, as the milk in the pail affords a fertile medium for bacterial propagation.

It is also known to provide above the pail a receptacle or trap for intercepting and holding any liquid that may be discharged from the piping. To the air discharge in the cover of the pail is connected an upstanding pipe of considerable height, reaching in fact to near the top of the receptacle or trap; the open upper end of the pipe being at such a considerable distance above any pool of liquid that may be trapped in the receptacle that the liquid cannot enter the pipe and thereby pass through the opening in the pail cover into the pail. The usual check valve is placed at the top of the pipe; the idea being that in case of a sudden rush of air, as in the disconnection of the suction pipe from its source of suction, resulting in the stirring up and atomizing of the collected or trapped liquid, the check valve will prevent the entrance of such atomized liquid. In this construction a tightly seating check valve is not deemed to be necessary, because an imperfectly seated or leaky valve is supposed to prevent so violent a rush of air through the trap as would cause any stirred up or atomized liquid to escape through the valve and thereby pass through the standpipe into the pail.

It may be questioned whether a check valve, even positioned at a considerable height above a body of trapped, stirred-up and atomized liquid, will effectually prevent the entrance of particles of atomized liquid; but in any event an imperfectly fitting check valve (and no means has been devised to insure the perfect seating of a check valve at all times) cannot guard against the admission of air from the piping. I have found that bacteria is carried into the pail not only by liquid, but by air from the piping. Moreover, the provision of any kind of a trap, whereby the liquid which is to be excluded collects and accumulates in the vicinity of the air outlet from the pail, is obviously objectionable.

In the type of milking machine wherein double-chamber teat cups are used and wherein the outer teat cup chambers are exposed alternately to atmospheric pressure and suction, the suction being carried over the pail into the suction pipe that is attached to the vacuum main, the intermittent withdrawal of air from the teat cup chambers produces more or less variation of pressure in the vicinity of the air outlet from the milk pail, thereby tending to force air into the pail through an imperfectly seated valve; and in case of leakage of the flexible partition between the outer and inner chambers of a teat cup, more or less milk may be carried into the piping and be there contaminated and a small part of it forced into the pail under or around the valve. If this leaking milk, or any other liquid, be allowed to accumulate in the vicinity of the air outlet from the pail, the danger of its accidental admission to the pail will be increased.

My efforts, therefore, have been directed to the avoidance of any "trap" for liquid and to the provision of means whereby any liquid in the piping will be continuously carried off during the milking operation and also to the provision of means whereby the air outlet from the pail will be effectually sealed at all times when the absolute pressure in the exhaust piping outside the pail exceeds the absolute pressure within the pail.

Efforts to provide a check valve which will be absolutely reliable and certain have not, however, succeeded, and more or less trouble has been experienced with the leaky check valves of milking machines actually in use both experimentally and commercially. I finally, however, accomplished the desired object of arranging at the air outlet from the pail a plurality of check valves in series. The specific construction shown in the accompanying drawings, wherein one valve is stopper-shaped and directly engages that part of the pail cover surrounding the opening in the pail, while the other is cup-shaped and surrounds the first valve and engages a concentric part of the cover of the pail, has substantial advantages; although my invention is not limited to this preferred embodiment of my invention. The invention will be more clearly understood by a detailed explanation of the preferred embodiment shown in the drawings, the single figure of which comprises a vertical cross-section through the milk pail and diagrammatic views of two of the teat cups, a secondary pulsator, the two mains (vacuum and pulsation) and pipe connections from the latter to the milking machine unit.

The teat cups $a$ have each a teat chamber and an inflation chamber. $b$ is a milk pipe leading to the milk pail $c$ and connected with the inner chambers of the teat cups. $d$ is a valve operated by any approved means. The valve is preferably a secondary pulsator operable, through a pulsation tube $e$ and a pulsation main $f$, from a master pulsator (not shown), as described in the Forsyth Patent No. 1,257,688. The secondary pulsator may be of any approved construction, as, for example, that shown in the Leitch Patent No. 1,255,186, although I have shown a simplified valve of the specific construction shown in the Leitch Patent No. 1,196,000. The valve $d$, under the impulse of pneumatic pulsations transmitted through the main $f$ and pipe $e$, connects the inflation chambers of the teat cups alternately with atmosphere and a vacuum pipe $g$ connected at its other end with a valve chamber $h$ on top of the milk pail cover $i$. From the chamber $h$ a flexible pipe $j$ leads to a vacuum main $k$, the latter being connected with a vacuum pump (not shown). Through the bottom of the chamber $h$ is an opening from the under side of the pail cover, over which is placed a check valve $m$ having the form of an inverted shallow cup guided by a slightly raised seat for a second check valve $n$ guided by a stem entering the opening.

In operation, the pipe $j$ is connected with the vacuum pipe line $k$ and air is exhausted through it from the pipe $g$, the pail $c$, the milk pipe $b$ and the inner or milk chambers of the cups that have been placed on the teats. The valve $d$, by connecting the outer or inflation chamber of the cup alternately with atmosphere and vacuum, produces a manipulation of the teats, causing a flow of milk, which is drawn through the pipe $b$ to the pail.

When an inflation chamber, previously connected with atmosphere, is, by the operation of the valve $d$, connected with the pipe $g$, there is a sudden rush of air through this pipe, the chamber $h$ and the flexible pipe $j$, causing a rise of pressure tending to force part of the air into the milk pail. This is stopped by the check valve $m$ and, if this valve leaks, a second stop is provided by the valve $n$. The valves operate in the same manner when the tube $j$ is disconnected from the vacuum main $k$ at the conclusion of the milking operation. When milk vapors and air raise the pressure in the pail above that in the chamber $h$, the valves open and allow them to escape.

The location of the suction pipe $j$ relatively to the valve chamber $h$ prevents the trapping of any liquid in the valve chamber, the valve chamber thus operating as a passage through which suction is transmitted to both the interior of the pail and the pulsation chambers of the teat cups. This valve chamber or passage is thus kept free of liquid during the milking operation, and in the event of any temporary escape of liquid into the same, due to any cause whatever, reliance may be had upon the compound check valve construction to prevent any passage of the liquid into the air outlet in the pail cover.

Having now fully described my invention, what I claim and desire to protect by Letters Patent is:

1. In a milking machine, the combination with the teat cups, the milk pail provided with an air outlet, a milk pipe connecting the teat cups and milk pail, and a suction pipe, of a plurality of check valves in series controlling the pail outlet and arranged to allow the free suction of air through said outlet into the suction tube and preventing by their joint action the passage of liquid or vapor through said outlet into the pail.

2. In a milking machine, the combination with the teat cups, the milk pail provided with an air outlet, a milk pipe connecting the teat cups and milk pail, and a suction pipe, of a plurality of check valves in series positioned to independently control the same outlet and adapted to freely open to allow withdrawal of air from the pail, said valves tending to close in the event of an absolute pressure in the suction tube exceeding the pressure within the pail, the closure of one valve neutralizing any leakage in another valve.

3. In a milking machine, the combination with double chamber teat cups, the milk pail provided with an air outlet, a connection between the milk chambers of the teat cups and the pail, a source of suction, and means affording a passage from the inflation chambers of the teat cups to the source of suction, of a plurality of check valves in series permitting free flow of air through said pail outlet to said passage but coöperating to seal said pail outlet against a reverse flow of air, vapor or liquid.

4. In a milking machine, the combination with the teat cups, the milk pail provided with an air outlet in its top, a milk pipe connecting the teat cups and the pail, and a suction pipe, of a stopper-shaped flanged valve extending into said outlet, and seating against the top of the pail adjacent said outlet, and a cup-shaped valve overlying and surrounding the first valve and seated against a part of the tòp of the pail concentric to the seat of the first valve.

5. In a milking machine, the combination with double chamber teat cups, the milk pail provided with an air outlet in its top, a milk pipe connecting the milk chambers of the teat cups and the pail, a suction tube, and a tubular connection from the inflation teat cup chambers, of a valve chamber communicating with the pail outlet, said tubular connection and said suction tube and affording a passage for exhaust air from both the inflation chambers of the teat cups and the pail to the suction tube, and a compound check valve controlling the outlet from the pail to said passage.

6. In a milking machine, the combination with double chamber teat cups, the milk pail provided with an air outlet in its top, a milk pipe connecting the milk chambers of the teat cups and the pail, a suction tube, and a tubular connection from the inflation teat cup chambers, and a valve chamber communicating with the pail and said tubular connection, of a check valve contrivance closing the pail outlet, the said suction tube communicating with said valve chamber substantially on a level with the bottom thereof, thereby preventing the trapping of liquid adjacent the pail outlet and insuring the immediate withdrawal into the suction tube of any liquid that may find its way into said passage.

In testimony of which invention, I have hereunto set my hand, at Poughkeepsie, N. Y., on this 23 day of October, 1919.

MEREDITH LEITCH.